United States Patent Office 3,444,460
Patented May 13, 1969

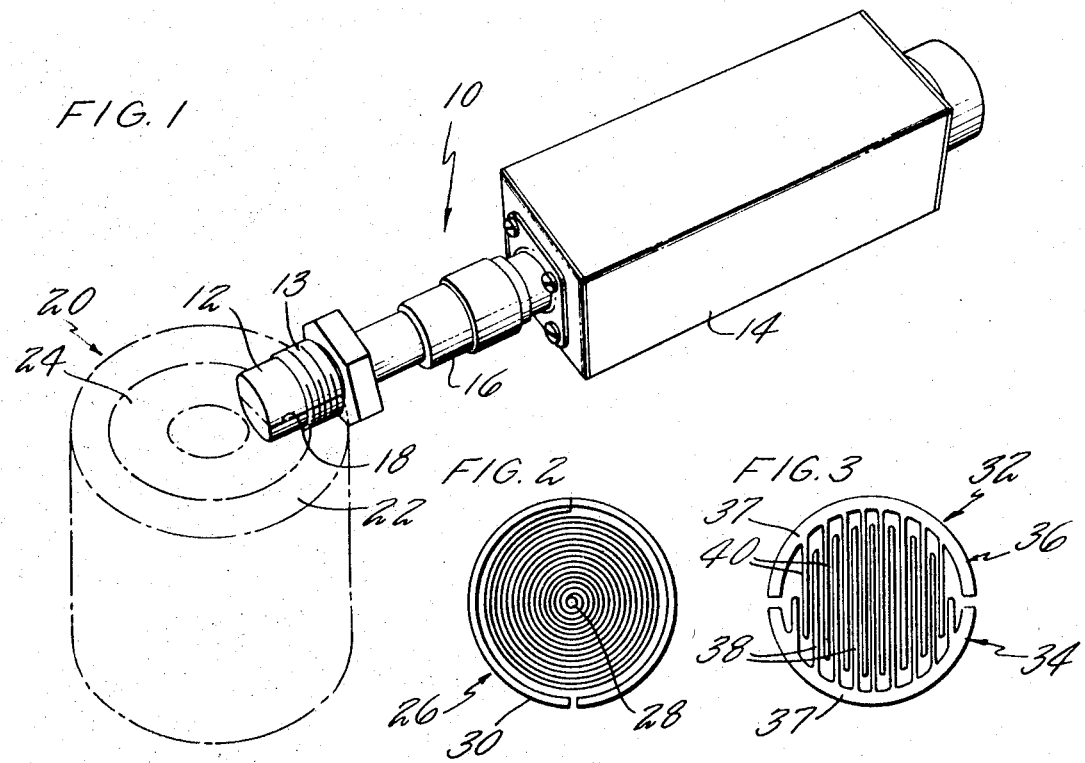
FIG. 1
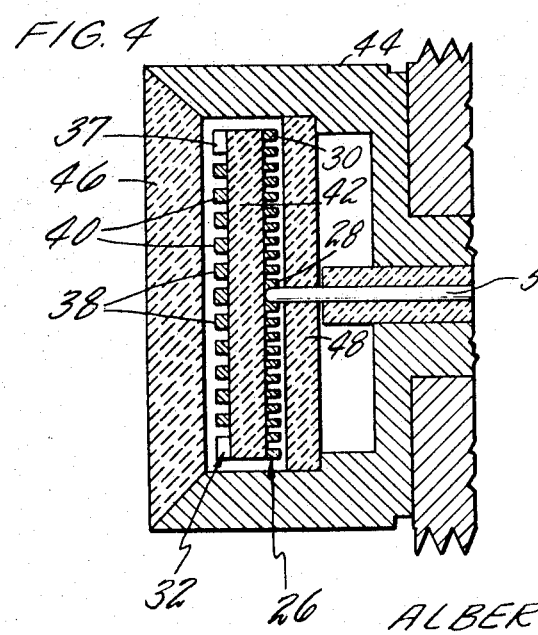
FIG. 2
FIG. 3
FIG. 4
INVENTOR
ALBERT W. PENNEY, JR.
BY Melvin Pearson Williams
ATTORNEY

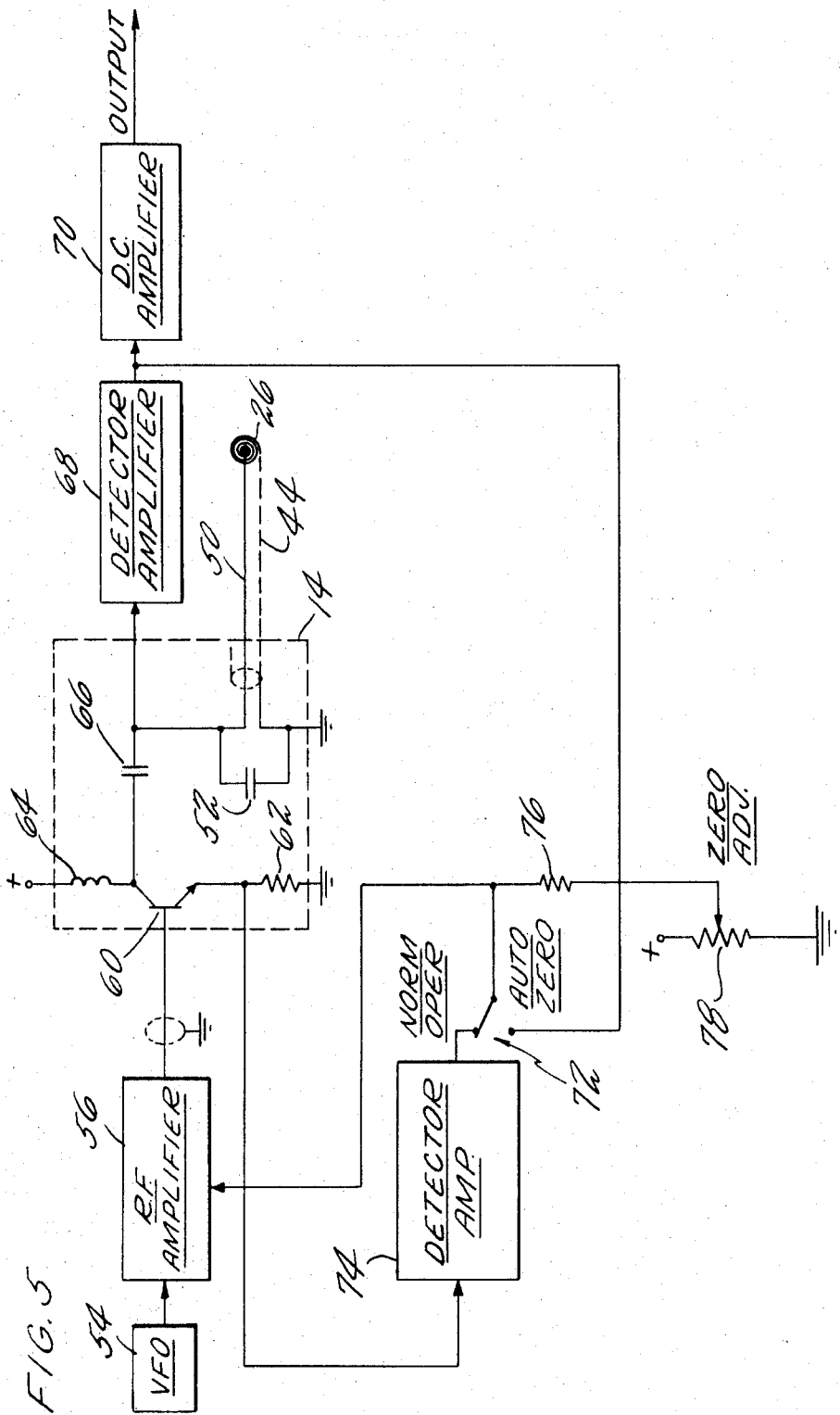

3,444,460
ELECTRODELESS RADIO FREQUENCY CONDUCTIVITY PROBE AND CIRCUITS THEREFOR
Albert W. Penney, Jr., Glastonbury, Conn., assignor to United Aircraft Corporation, East Hartford, Conn., a corporation of Delaware
Filed Nov. 30, 1966, Ser. No. 598,011
Int. Cl. G01r 33/14, 17/06
U.S. Cl. 324—40                                3 Claims

ABSTRACT OF THE DISCLOSURE

A flat, spiral, magnetic coil is etched on a conductive coating of a thermal insulator circuit board, the other side of the board having a dual, interleaved Faraday shield etched thereon. The flat spiral magnetic coil is supplied with a constant current to achieve voltage directly proportional to resistance, thereby achieving a linear conductance measurement; feedback allows nulling of DC and low frequency AC response.

This invention relates to a conductivity probe, and more particularly to probe and circuit improvements in apparatus for measuring the electrical conductivity of matter.

This invention is an improvement on electrodeless RF conductivity measurements which represent the present state of the art. In U.S. Patent No. 3,152,303, Electrodeless Radio Frequency Conductivity Probe for Fluids, filed on June 11, 1962, by E. C. Lary and R. A. Olson, and assigned to the same assignee as the present invention, there is described a probe for measuring the conductivity of plasma or working fluids without exposure of the critical components of the probe to the fluid or plasma being measured so as to reduce the problems of fouling and corrosion. Therein, a probe has an inductive element encased in an envelope of insulating material which is subjected to radio frequency current. A magnetic field created thereby generates circulating, azimuthal currents in a fluid in which the probe is immersed. The measurement of conductivity of the fluid is achieved by monitoring the dissipation of RF power which results from the conductivity of the fluid and is therefore proportional thereto. Comparison with similar power dissipation measurements of fluids of known conductivity provides a relatively accurate indication of the conductivity of the fluid under test. In said Lary et al. patent, the amount of power dissipated in the fluid or plasma under test is inversely proportional to the amount of current carried to the grid of a triode, the plate of which supplies the radio frequency energy to the coil which is used to perform the test. Stated alternatively, the azimuthal currents which are induced in the medium under test by absorbing power from the test coil acts so as to perform the equivalent of inserting resistance into a tank circuit which includes the test coil, and this resistance lowers both the Q of the coil and the amount of voltage which is coupled to the grid of the RF coil circuit triode so as to increase the current flow to the coil thereby compensating for the power lost therein.

The success of the conductivity probe disclosed in said Lary et al. patent has resulted in a wider use of such probes, and has suggested further uses to which said Lary et al. probe is not particularly well suited. For instance, said Lary et al. probe utilizes a helical magnetic coil, so its application to the measurement of conductivity of a medium requires the insertion of the probe into the medium so that the probe is surrounded thereby. This subjects the external envelope of the probe to the thermal and caustic environment of the medium under test, so that special protection and temperature control apparatus are required in the use of the probe. Additionally, since the probe must be immersed in the medium which is to be measured, its use is limited to fluids and to plasmas in a relatively fluid-like state. Since the probe relies on the transport of fluid for temperature control, it is not solid, and is therefore relatively fragile; similarly the use of vacuum tube circuits therewith and the need for a complex power supply renders the probe relatively unsuited for portable use or for mounting on space-limited moving objects and vehicles and in other severe mechanical environments.

The circuits used in Lary et al. to monitor the power loss through the coil (so as to produce an indication of conductivity) do not perform this function in a linear manner. Additionally, a basic problem of said Lary et al. probe is that the electrostatic shield comprising a thin layer of conductive material, such as platinum, must be kept sufficiently thin so as not to act as a magnetic shield (i.e., less than three or four times the electromagnetic skin depth of currents at the operating frequency of the device). Thus, full electrostatic shielding with a film is achieved only with a concomitant loss in the ability to communicate a magnetic field. On the other hand, using a thin film for electrostatic shielding so that it does not interfere with the magnetic field results in less than optimum electrostatic shielding.

Wherefore, the principal object of the present invention is to provide improved conductivity measuring apparatus.

Other objects of the present invention include the provision of:

A probe for measuring the conductivity of solids and nonfluid plasmas as well as for fluids;

A conductivity probe in which a minimum of the surface thereof is subjected to the environment of the medium under test;

A conductivity probe having improved shielding;

A conductivity probe having a highly effective electrostatic shield which does not reduce the sensitivity of the probe; a true ground plane shield having low series inductance;

A conductivity probe having a negligible electrostatic input error;

Conductivity measuring apparatus which provides a linear reading of the conductivity of the medium under test;

Conductivity measuring apparatus of solid construction, suitable for use in severe mechanical environments;

Conductivity measuring apparatus having a high sensitivity;

A conductivity probe including improved, simple temperature control;

A conductivity probe which does not require free flow of fluid therein for the purpose of controlling the temperature thereof;

A simple, inexpensive conductivity probe which is readily manufactured; and

Improved circuitry for conductivity measuring apparatus.

These and other objects are achieved in accordance with the present invention by a flat spiral magnetic coil which is etched on a conductive coating of a solid state circuit board, the other side of the board having a dual, interleaved Faraday shield etched thereon. The flat spiral magnetic coil is supplied with a constant current, so that the voltage across the coil is directly proportional to the resistance therein; the resistance in the coil circuit is inversely proportional to the conductance reflected therein by the medium under test, whereby the manifestation of the conductance is linear. The probe itself is made entirely of solid state materials including the shielded coil together with electrical and thermal conductors and insulators of solid materials.

In accordance with other aspects of the present invention, inproved circuitry for use with the conductivity probe described hereinbefore is solid state, utilizing transistor rather than vacuum tubes. Tuned (RF) circuitry, frequency compensation, and feedback current control together with zero adjusting and various compensating circuitry are provided.

Since a flat spiral coil is used as the primary element of conductivity apparatus in accordance herewith, it may be brought into close proximity with the material to be tested, whereby good sensitivity is achieved. Additionally, since it is flat, the probe need not be directly immersed in the medium to be tested, whereby fouling, corrosion, and excess thermal effects are minimized. Furthermore, since the coil is flat, it may be made in accordance with will-known techniques of solid state circuitry, such as through the etching of a conductive layer upon a solid board. The use of a flat spiral coil also permits utilizing a classical Faraday shield in conjunction therewith, which is not readily attained with any shape of magnetic coil.

A Faraday shield of the classical type used herein gives complete electrostatic shielding with absolutely no effect on the magnetic field. Additionally, the classical Faraday shield may be produced by etching of solid materials; additionally, it may be produced on the same component card as the coil itself, whereby the coil and the Faraday shield may be held in an extremely close proximity with accuracy, and with solid state rigidity which permits utilization of the probe in severe mechanical environments without the danger of relative displacement between the probe and the shield. Since the classic Faraday shield used herein has no effect on the magnetic field, maximum sensitivity is maintained with a minimum of interference whereby a much greater signal-to-noise ratio is obtained herewith than has been obtainable heretofore.

The magnetic coil on a Faraday shield described hereinbefore permits fabrication of the probe in a completely solid coaxial form, which makes it possible to utilize the probe in a great variety of severe environments. Additionally, a probe in accordance herewith is readily manufactured at relatively low cost, as is more apparent in the light of the detailed descriptions hereinafter.

The utilization of a constant current generator, with feedback control, maintains linearity and provides relatively simple drift and compensation controls. Due to the linearity of the circuit, zero adjusting and drift compensations are readily achieved since there is no need for over-adjustments at low ranges to compensate for the nonlinearity which may be achieved under actual operating conditions.

The Faraday shield used herewith reduces electrostatic interplay between currents induced by the magnetic coil and the measuring circuitry to the extent that an absolute zero reading may be obtained, the zero reading being the lowest reading along a linear scale, whereby compensation and zero adjusting are very accurately achieved.

The foregoing and other objects, features and advantages of the present invention will become more apparent in the light of the following detailed description of preferred embodiments thereof, as illustrated in the accompanying drawings, in which:

FIG. 1 is a perspective view of the exterior of a probe and probe head assembly in accordance with the present invention, shown in an exemplary environment in which the assembly is permanently mounted on a fluid conducting member to be monitored;

FIG. 2 is a plan view of a coil for use in the probe of the present invention;

FIG. 3 is a plan view of a Faraday shield for use in the probe of the present invention;

FIG. 4 is a partially sectioned elevation of a conductivity measuring probe in accordance with the present invention; and FIG. 5 is a partially schematized block diagram of conductivity measuring circuitry in accordance with the present invention.

Referring now to FIG. 1, one embodiment of the present invention includes a conductivity probe 10 including a probe tip 12 and a probe head assembly 14 which are mechanically and electrically joined by a coaxial connector 16. As seen in FIG. 1, the probe tip 12 is adapted for mounting within a threaded socket 18, by an attached locking nut 13, in a structure 20 such as a pipe for conducting fluids, the conductivity of which is to be monitored by the conductivity measuring apparatus in accordance with the present invention. The pipe structure 20 may be formed of two concentric layers of material, such as an outer metal layer 22 and an inner thermal and electrical insulating layer 24 which may be, for instance, boron nitride. The essential characteristics of the probe tip 12 are shown in more detail in FIGS. 2–4.

In FIG. 2 is shown the flat spiral coil 26, which includes a central conductor 28, an outer conducting ring 30 and a conducting coil which spirals from the central conductor 28 outwardly to a point where it joins the outer conductor ring 30. In FIG. 3 is shown a preferred form of Faraday shield 32 for use with the present invention. This is comprised of two sections 34, 36 each of which includes a semicircular conducting ring 37 with a plurality of orthogonal grid members 38, 40, extending therefrom so as to form a Faraday shield comprising double, interleaved sections of the classical type of Faraday shield. The grid members 38 are interleaved with the grid members 40, and are spaced therefrom so as to provide electrostatic shielding without magnetic interference. Since a ground plane is formed within the rings, and the rings are in full contact with ground potential (the outer coaxial conductor 44 of the probe tip, FIG. 4), the shield has very low series inductance. Although the shield 32 is preferably as shown in FIG. 3, a single section may be used alone if desired in certain applications. The magnetic coil 26 and electrostatic shield 32 (FIGS. 2 and 3) are preferably formed by selective etching or erosion of conductive coating on two opposite surfaces of an insulating circuit board. This is illustrated in exaggerated fashion in FIG. 4 wherein the coil 26 and shield 32 are integrally formed on a circuit board 42. This circuit board 42 comprises a base member with electrical conductive coatings on either side, the conductive coatings being selectively etched so as to form the coil 26 and shield 32. Since the shield 32 is formed of very thin flat elements, the capacitance between elements is extremely low. The interleaving of elements causes magnetic effects in adjacent elements to cancel each other, so the inductance of the shield is also extremely low. Thus, the resonant frequency of the shield is very high, so that it is effective as a true ground plane shield to very high frequencies. Although the shield of FIG. 3 is round so as to fit the coaxial configuration of the probe tip 12 herein, it could be square, or of any other suitable shape in different utilizations thereof. The essential characteristic is having the peripheral conducting portions 37, together, substantially surround the grid members 38, 40.

The base member may preferably be comprised of thorium oxide which has a good thermal insulating property, or it may consist of some other ceramic materials where very high temperatures are to be used. On the other hand, if desired, conventional circuit board material such as fiber glass or epoxy may be selected. The coil 26 and shield 32 are disposed within a metallic conducting cylinder 44, the end of which is sealed with a thermally stable nonconducting material 46 such as thorium oxide, ceramic, fiber glass, epoxy or mica. Internally of the shield 26 is another insulating layer 48 which may preferably be a good thermal conductor though electrical insulator, such as beryllium oxide. The layer 48 provides mechanical support for a central conductor 50 which completes the coaxial structure of the probe tip 12. The use of good thermal insulation below the shield 32, and between the shield 32 and coil 26, together with a good thermal conductor 48 on the inside of the shield 36 provides improved thermal stability to the coil 26, whereby thermal drift of conductivity readings is kept at a minimum. If desired, of course, a cooling fluid may be introduced into the upper area of the probe tip so as to further stabilize temperature conditions at the shield 36.

The probe head assembly 14, shown generically in FIG. 1 with relation to the probe tip 12 and connector 16, may contain circuitry as illustrated in FIG. 5. Therein spiral coil 26 is shown connected to the probe head assembly 14 by the central coaxial conductor 50 and by the outer conducting coaxial cylinder 44. Within the probe head assembly 14, a shunt capacitor 52 forms a resonant circuit with the coil 26. When the parallel resonant circuit comprising the inductive coil 26 and capacitor 52 are driven with a constant current at the resonant frequency of the circuit (which may be in the radio frequency spectrum), the LC circuit (26, 52) has a voltage drop which is proportional to the Q, or resonant quality factor, of the circuit. Any conducting media brought near the sensing end of the probe tip 12 decreases the Q of the circuit 26, 52 which produces a corresponding decrease in the RF voltage developed across the LC circuit 26, 52. This RF voltage when converted to a DC voltage, properly compensated and amplified, results in a DC signal voltage which is directly proportional to the conductivity of the media. It is important to note that capacitive proximity effects on the resonant circuit, and polarization effects dependent upon the dielectric constant of the conducting medium being measured, are eliminated by the Faraday shield which insures that only magnetic coupling is effected between the coil 26 and the medium under test. The electric field of the magnetic coil 26 is blocked from the conducting media by the Faraday shield. Shielding is so effective that electrolytic solutions may be used for calibration of the probe, since the probe gives no indication of conductivity when the tip thereof is completely immersed in deionized water. This is one of the features of the present invention. Thus, the essential electrical components of the present invention comprise a coil 26 together with its Faraday shield 32 and parallel with a capacitor 52 which provides a completely magnetic, nonelectrostatic system which, if driven with a constant current source at the resonant frequency of the LC circuit comprising the coil 26 and the capacitor 52, will give a direct, linear indication of the conductivity of the medium under test.

A variable frequency oscillator 54 (hereinafter referred to as VFO) generates an RF voltage which is adjusted to equal the resonant frequency of the LC circuit, (26, 52). This voltage is amplified in an RF amplifier 56 which provides resonant frequency current to the base of a transistor 60, herein illustrated as being of the NPN type. The transistor 60 is provided with a relatively large emitter resistor 62, which results in an RF emitter current that is proportional to the RF base voltage. Since the incremental current gain of the transistor 60 is quite high, the transistor 60 and its associated circuitry perform as a constant current source. The collector of the transistor 60 is connected to a positive source by an RF choke coil 64, and to the junction of of the coil 26 and capacitor 52 through a coupling capacitor 66.

The voltage developed across the LC combination of capacitor 52 and the magnetic coil 26 is fed to a combination detector amplifier 68 which monitors the envelope of the RF voltage (in the manner similar to that of an AM radio receiver detector) so as to provide a DC output which may be amplified (70) so as to provide a suitable output which may be monitored in any of a variety of well-known ways. The output of the detector amplifier 68 is also fed to a switch 72 which may be selectively set to be responsive thereto or to be responsive to a second detector amplifier 74. The second detector amplifier 74 monitors the voltage across the emitter resistor 62. The output of the switch 72 is connected to the RF amplifier 56 and operates to control the amplification thereof. This may be effected by utilizing the output of the switch 72 as the collector voltage for a transistor amplification stage, or as the plate voltage of a vacuum tube circuit. Preferably, transistorized circuitry is used throughout, and therefore the modification of the supply of the collector potential for a final amplification stage would be provided by the output of the switch 72. The switch 72 is also connected through a resistor 76 to a zero adjustment potentiometer 78 which establishes a general level about which the potential may vary in accordance with the output of the switch 72. The zero adjust would be used to compensate for all the circuit parameters so as to provide a proper amplitude of current from the RF amplifier 56 to the base of the transistor 60. Either of the detector amplifiers 74, 68 supply a rectified (detected), amplified indication which, after amplification, is used as a voltage reference for controlling the RF amplifier 56. The detector amplifier 74, being responsive to the voltage across the emitter resistor 62 provides a voltage indication of the amount of current being supplied to the base of the transistor 60, and through suitable adjustment, can maintain that current constant. This is in accordance with one of the features of the present invention. In accordance with a further feature of the present invention, when the switch 72 is transferred from the normal operation position (as shown in FIG. 5) to the auto zero position, all steady-state effects in the system can be cancelled out so that only transient effects can be monitored. This is due to the fact that the output of the detector amplifier 68 itself being used as a potential reference for controlling the RF amplifier 56, any variation which is slow enough to be fed back from the detector amplifier 68 to the RF amplifier 56 can cause a concomitant change in the amount of current supplied to the transistor 60, thereby adjusting the possible potential across the LC circuit 26, 52. However, any change in conductance at the coil 26 which is so rapid that it is not discernible by the high pass characteristics of the detector amplifier 68 will supply discernible output to the DC amplifier 70. This output will have not effect on the RF amplifier 56 and therefore will be suitably amplified without being smothered in the circuitry of FIG. 5.

Having thus described typical embodiments of the invention, what I claim as new and desire to secure by Letters Patent of the United States is:

1. In a probe for measuring the electrical conductivity of matter, said probe including a magnetic coil, an electrostatic shield and a coaxial conductor surrounding said coil and shield, the improvement which comprises:
   said magnetic coil consisting of a flat, planar spiral;
   said electrostatic shield consisting of a flat, planar Faraday shield positioned adjacent to but electrically insulated from said spiral and spaced between said spiral and the surface of said probe which is to be positioned adjacent the medium, the electrical conductivity of which is to be measured;
   said magnetic coil and electrostatic shield comprising shaped conductive coatings on respective opposite sides of a nonconductive circuit board composed of a thermal insulating material.

2. In an electrical conductivity measuring apparatus including a probe having a magnetic coil, the power loss from which provides an indication of the electrical conductivity of the medium of the test, said coil being included in a parallel resonant circuit with a capacitor, the improvement which comprises:
   a source of constant amplitude alternating current, said source providing current at the resonant frequency of said parallel resonant circuit, said source being connected to said parallel resonant circuit, whereby the voltage developed across said parallel resonant circuit provides an indication of the quality factor of said circuit, including any conductance reflected therein as a function of the conductivity of the medium under test; said source comprising:
a high current gain transistor amplifier having a high impedance emitter resistor, the collector of said transistor being coupled to said parallel resonant circuit;
an oscillator operating at the resonant frequency of said parallel resonant circuit;
amplification means responsive to said oscillator, the output of which is applied to the base of said transistor, said amplification means having a variable amplification factor responsive to a steady-state potential applied thereto;
and means responsive to the potential across said emitter resistor for supplying said steady-state potential to said amplification means to control the current supplied to said base in feedback relationship.

3. In an electrical conductivity measuring apparatus including a probe having a magnetic coil, the power loss from which provides an indication of the electrical conductivity of the medium of the test, said coil being included in a parallel resonant circuit with a capacitor, the improvement which comprises:
a source of alternating current power, said source providing power to said parallel resonant circuit at the resonant frequency thereof;
means responsive to said parallel resonant circuit providing a DC output signal proportional to the steady-state conductivity of the medium under test; and
means in said current source for controlling the amplitude of said current in response to said DC output signal, the magnitude of said current being inversely proportional to said DC output signal, whereby only time variants in conductivity are measured by said apparatus.

References Cited
UNITED STATES PATENTS

| | | | |
|---|---|---|---|
| 2,505,778 | 5/1950 | Limbach | 324—40 |
| 2,989,691 | 6/1961 | Cook | 324—40 X |
| 3,013,102 | 12/1961 | Doll | 336—84 X |
| 3,089,106 | 5/1963 | Saaty | 336—232 X |
| 3,230,449 | 1/1966 | Kaiser | 324—60 |
| 3,255,405 | 6/1966 | French | 174—35 X |

RUDOLPH V. ROLINEC, *Primary Examiner.*

ALFRED E. SMITH, *Assistant Examiner.*

U.S. Cl. X.R.

174—35; 324—34, 99